United States Patent
Ito et al.

(10) Patent No.: US 12,448,312 B2
(45) Date of Patent: Oct. 21, 2025

(54) GLASS PRODUCTION METHOD

(71) Applicant: NIPPON ELECTRIC GLASS CO., LTD., Otsu (JP)

(72) Inventors: Nobutoshi Ito, Otsu (JP); Kazuto Nakatsuka, Otsu (JP); Tsubasa Kagai, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 134 days.

(21) Appl. No.: 18/285,773

(22) PCT Filed: Mar. 22, 2022

(86) PCT No.: PCT/JP2022/012958
§ 371 (c)(1),
(2) Date: Oct. 5, 2023

(87) PCT Pub. No.: WO2022/215505
PCT Pub. Date: Oct. 13, 2022

(65) Prior Publication Data
US 2024/0368016 A1    Nov. 7, 2024

(30) Foreign Application Priority Data
Apr. 7, 2021    (JP) ................. 2021-065148

(51) Int. Cl.
*C03B 5/185*    (2006.01)
*C03B 5/02*    (2006.01)

(52) U.S. Cl.
CPC .............. *C03B 5/185* (2013.01); *C03B 5/021* (2013.01)

(58) Field of Classification Search
CPC ......... C03B 5/18; C03B 2201/08; C03B 5/01; C03B 3/02; C03B 5/225; C03C 3/321
See application file for complete search history.

(56) References Cited

U.S. PATENT DOCUMENTS

| | | | |
|---|---|---|---|
| 3,451,794 A | 6/1969 | Patterson | |
| 3,743,492 A | 7/1973 | Ogita | |

(Continued)

FOREIGN PATENT DOCUMENTS

| | | | | |
|---|---|---|---|---|
| CN | 106380060 A | * | 2/2017 | ........... C03B 5/0334 |
| CN | 107021622 A | * | 8/2017 | ............... C03C 4/10 |

(Continued)

OTHER PUBLICATIONS

Official Communication issued in International Patent Application No. PCT/JP2022/012958, mailed on Jun. 7, 2022.

(Continued)

*Primary Examiner* — Erin Snelting
*Assistant Examiner* — Steven S Lee
(74) *Attorney, Agent, or Firm* — Keating & Bennett, LLP

(57) ABSTRACT

Provided is a glass production method with which oxidation can be suppressed and productivity can be increased. A glass production method according to the present invention includes the steps of: turning a raw material 6 placed in a container 1 into a melt 11; homogenizing the melt 11; removing a gas from the melt 11, wherein at least one of the step of turning the raw material 6 into the melt 11 and the step of homogenizing the melt 11 is performed in an atmosphere of an inert gas or a reducing gas, and in the step of the removing the gas from the melt 11, the inert gas or the reducing gas is removed by setting the temperature of the melt 11 to be lower than the temperature in the step of homogenizing the melt 11.

3 Claims, 3 Drawing Sheets

(56) References Cited

U.S. PATENT DOCUMENTS

| | | |
|---|---|---|
| 2004/0186000 A1 | 9/2004 | Kawamoto et al. |
| 2004/0206119 A1* | 10/2004 | Syllaios .................. C03C 3/321 65/29.21 |
| 2006/0101859 A1 | 5/2006 | Takagi et al. |
| 2016/0214881 A1 | 7/2016 | Mikami |
| 2016/0257593 A1* | 9/2016 | Nguyen .................. C03B 25/00 |
| 2019/0092672 A1* | 3/2019 | Gromann .................. C03B 5/18 |

FOREIGN PATENT DOCUMENTS

| | | | | |
|---|---|---|---|---|
| CN | 108726850 A | * | 11/2018 | ............. C03B 19/02 |
| JP | S49128739 A | | 12/1974 | |
| JP | 06-183779 A | | 7/1994 | |
| JP | H0699164 B2 | * | 12/1994 | ............... C03B 3/32 |
| JP | 2004091307 A | * | 3/2004 | ............. C03B 5/193 |
| JP | 2004-269347 A | | 9/2004 | |
| JP | 2005-154216 A | | 6/2005 | |
| JP | 2016150887 A | | 8/2016 | |
| JP | 2019026530 A | * | 2/2019 | ............. C03C 3/321 |
| WO | WO-9914167 A1 | * | 3/1999 | ........... C03C 13/043 |
| WO | 2008/029649 A1 | | 3/2008 | |
| WO | 2015/046428 A1 | | 4/2015 | |
| WO | 2019/102895 A1 | | 5/2019 | |
| WO | 2020/189420 A1 | | 9/2020 | |

OTHER PUBLICATIONS

Official Communication issued in corresponding European Patent Application No. 22784490.9, mailed on Feb. 14, 2025, 9 pages.

Buschmann et al., "Solubility of helium in glass melts of the chalcogenide system Se—Ge—As", Physics and Chemistry of Glasses vol. 23 No. 3, Jun. 1982, pp. 102-106.

Jewell et al., "The solubility of inert gases in a heavy metal fluoride glass melt", Physics and Chemistry of Glasses vol. 29 No. 2, Apr. 1988, pp. 67-71.

Tournour et al., "Inert gas solubility in binary germania-silica glasses", Journal of Non-Crystalline Solids vol. 349, Nov. 2, 2004, pp. 209-214.

* cited by examiner

GLASS PRODUCTION METHOD

TECHNICAL FIELD

The present invention relates to a glass production method.

BACKGROUND ART

In recent years, chalcogenide glass has been known as a material suitable for use in the field of infrared optics. Chalcogenide glass has infrared transmissivity and can be manufactured by press molding. For this reason, chalcogenide glass is good for mass production and cost reduction.

To produce an optical member such as a lens, for example, molten glass is cast by rapid solidification to form a glass ingot, which is then ground, polished, and cleaned to prepare a preform glass. Then, the preform glass is subjected to press molding or the like to prepare an optical member such as a lens.

Patent Document 1 below discloses an example of a production method of a glass article. In this production method, glass is obtained by melting a glass raw material in a vacuum-sealed ampoule.

CITATION LIST

Patent Literature

Patent Document 1: JP 06-183779 A

SUMMARY OF INVENTION

Technical Problem

Oxidation needs to be suppressed when forming a glass such as chalcogenide glass. With the method described in Patent Document 1, the oxidation can be suppressed, but the ampoule needs to be destroyed when taking out the glass. As such, it is difficult to sufficiently increase the productivity.

An object of the present invention is to provide a glass production method with which oxidation can be suppressed and productivity can be increased.

Solution to Problem

A glass production method according to the present invention includes the steps of: turning a raw material placed in a container into a melt; homogenizing the melt; and removing a gas from the melt, wherein at least one of the step of turning the raw material into the melt and the step of homogenizing the melt is performed in an atmosphere of an inert gas or a reducing gas, and in the step of removing the gas from the melt, the inert gas or the reducing gas is removed by setting the temperature of the melt to be lower than the temperature in the step of homogenizing the melt.

In the step of removing the gas from the melt, it is preferable to reduce pressure in the container.

Both the steps of the turning the raw material into the melt and the homogenizing the melt are preferably performed in an atmosphere of the inert gas or the reducing gas.

It is preferable to further provide the step of heating the melt and discharging the melt from the container after the step of removing the gas from the melt.

It is preferable that at least one of the step of turning the raw material into the melt and the step of homogenizing the melt is performed in an atmosphere of one of the inert gas and the reducing gas, and the step of discharging the melt from the container is performed in an atmosphere of the other of the inert gas and the reducing gas in the container.

The glass is preferably chalcogenide glass.

Advantageous Effects of Invention

The present invention can provide a glass production method with which oxidation can be suppressed and productivity can be increased.

DESCRIPTION OF EMBODIMENTS

Figure 1:
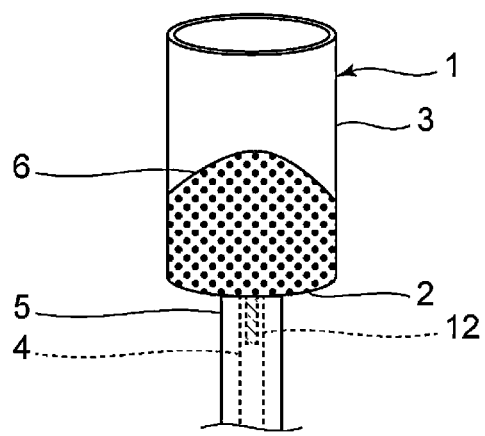
FIG. 1(a) to FIG. 1(c) are schematic cross-sectional views illustrating a step of turning a raw material into a melt in a glass production method according to one embodiment of the present invention.
Figure 1:
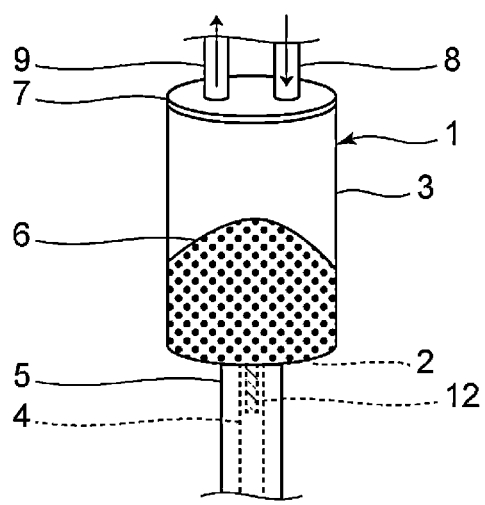
Figure 1:
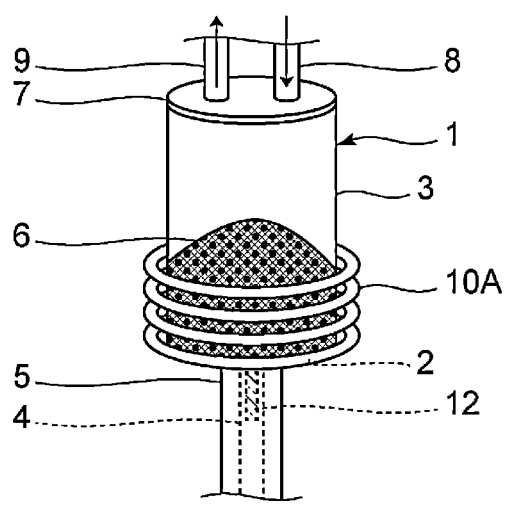

A preferred embodiment is described below. However, the following embodiment is merely an example, and the present invention is not limited to the following embodiment. Moreover, in the drawings, members having substantially the same functions may be given the same reference signs.

Glass Production Method

The feature of the present embodiment lies in a step of removing an inert gas or a reducing gas from a melt obtained by melting a raw material. Hereinafter, the production method of the present embodiment will be described with reference to the drawings.

Figure 2:
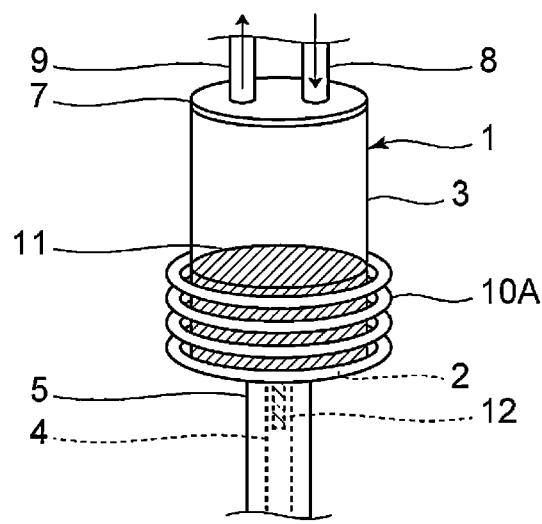
FIG. 2(a) and FIG. 2(b) are schematic cross-sectional views illustrating steps including and after a step of homogenizing the melt in the glass production method according to one embodiment of the present invention.
Figure 2:
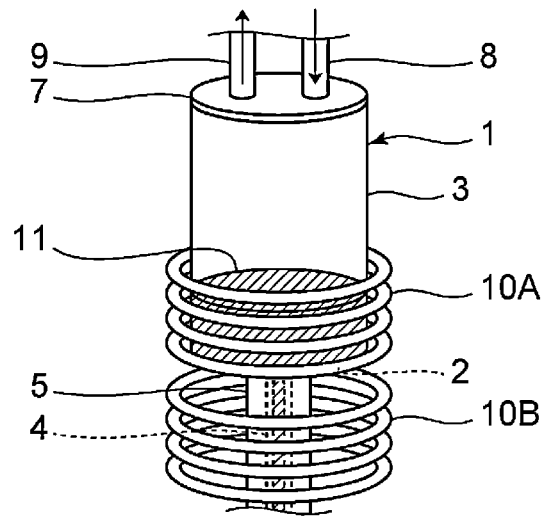
Figure 3:
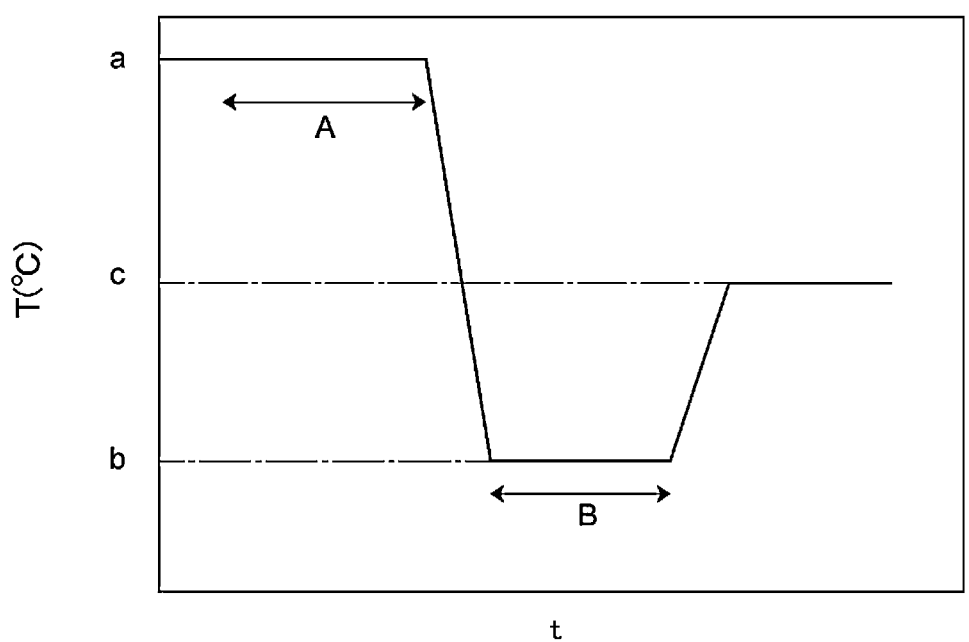
FIG. 3 is a graph showing a temperature profile in the glass production method according to one embodiment of the present invention.

FIG. 1(a) to FIG. 1(c) are schematic cross-sectional views illustrating a step of turning a raw material into a melt in a glass production method according to one embodiment of the present invention. FIG. 2(a) and FIG. 2(b) are schematic cross-sectional views illustrating steps including and after a step of homogenizing the melt in the glass production method according to one embodiment of the present invention. FIG. 3 is a graph showing a temperature profile in the glass production method according to one embodiment of the present invention. For convenience, a coil 10A or a coil 10B is omitted in some drawings. The temperature profile shown in FIG. 3 is an example, and the present invention is not limited thereto.

As an example of the present invention, the production method of the present embodiment is a method of producing chalcogenide glass. However, the method according to the present invention can also be applied to the production of other types of glass that are not chalcogenide glass.

As illustrated in FIG. 1(a), in the present embodiment, a crucible is used as a container 1. The container 1 includes a bottom portion 2 and a side wall portion 3. The container 1 is preferably made of quartz glass. In that case, glass can be suitably formed in the following steps.

A pipe 4 is connected to the bottom portion 2 of the container 1. A pipe sleeve 5 is disposed around the pipe 4. The pipe 4 extends through the inside of the pipe sleeve 5. In the present embodiment, the pipe 4 is made of quartz glass. The pipe sleeve 5 is made of Pt. However, the pipe sleeve 5 may be made of any suitable metal.

As illustrated in FIG. 1(a), a raw material 6 of glass is placed inside the container 1. In the present embodiment, the raw material 6 is a mixture containing a component constituting chalcogenide glass. In the present embodiment, the raw material 6 may contain a metal. Note that in the present invention, "metal" includes metal elements, metalloid elements, alkali metal elements, and alkaline earth metal elements. Details of the raw material 6 will be described below. Note that preferably, a small amount of the raw material 6 is melted in advance to form a small amount of a melt, and the small amount of the melt is discharged into the pipe 4. The small amount of the melt is cooled in the pipe 4, and a solidified product (solid glass) is obtained. In this way, a plug 12 can be formed. With the plug 12 formed, the raw material 6 can be disposed stably even when the pipe 4 is connected to the bottom portion 2 of the container 1.

Next, as illustrated in FIG. 1(b), a lid 7 is placed on the side wall portion 3 of the container 1. A gas supply pipe 8 and a gas discharge pipe 9 are connected to the lid 7. Gas inside the container 1 is discharged through the gas discharge pipe 9, reducing pressure inside the container 1. Next, an inert gas or a reducing gas is supplied into the container 1 from the gas supply pipe 8. This process is repeated, rendering the atmosphere inside the container 1 into an inert gas atmosphere or a reducing gas atmosphere.

As the inert gas, for example, nitrogen, helium, argon, or the like can be used. As the reducing gas, for example, hydrogen, carbon monoxide, a hydrocarbon gas, or the like can be used.

In forming chalcogenide glass, it is necessary to prevent the heated raw material 6 or the melt described below from reacting with oxygen or moisture. In the present embodiment, since the air inside the container 1 is replaced with an inert gas or a reducing gas, oxygen and moisture are removed from the container 1. Thus, chalcogenide glass can be suitably formed without the use of a sealed container kept in a vacuum state. In the present embodiment, as described below, the glass is formed after discharging the melt from the pipe 4 to outside of the container 1. Because of this, the container 1 does not need to be destroyed to take out the formed glass, and the container 1 can be reused.

Meanwhile, as illustrated in FIG. 1(c), the coil 10A is disposed surrounding at least a part of the side wall portion 3 of the container 1. Specifically, the coil 10A is disposed surrounding a part where the raw material 6 is disposed in the container 1. An electric current is supplied to the coil 10A, and the raw material 6 is induction-heated. Specifically, an electric current is supplied to the coil 10A, generating an induced magnetic field which in turn generates an induced current. The raw material 6 contains a metal, which has an internal resistance. The induced current flowing into the metal causes the metal contained in the raw material 6 to become a heat source, heating the entire raw material 6. By this induction-heating, the raw material 6 is turned into a melt 11, as illustrated in FIG. 2(a). The melt 11 is heated at a temperature of a° C. described below, whereby the reaction proceeds. In this way, the melt 11 can be homogenized.

The supply of an electric current to the coil 10A generates an induced magnetic field and an induced current, resulting in a Lorentz force being applied to the melt 11. The Lorentz force stirs the melt 11 to also contribute to the homogenization of the melt 11. As such, in the present embodiment, the melt 11 can be homogenized without using a means, such as a stirrer, that stirs the melt 11 by bringing a member into direct contact with the melt 11. However, a stirrer or the like may be used for the stirring to efficiently homogenize the melt 11.

As described above, some of the melt 11 is discharged into the pipe 4. The melt 11 in the pipe 4 is cooled and becomes a solidified product (solid glass). In this way, the plug 12 is formed. As such, a small amount of the melt 11 that corresponds to the plug 12 to be formed is discharged into the pipe 4, but the discharge of the rest of the melt 11 is stopped by the plug 12. However, a lid, a plunger, or the like may be used instead of the plug 12.

As indicated by a double-headed arrow A in FIG. 3, in the present embodiment, the step of homogenizing the melt 11 is performed at a° C. For example, a=600° C. to 1000° C. After the step of homogenizing the melt 11, the inert gas or the reducing gas is removed from the melt 11. More specifically, after the step of homogenizing the melt 11, the melt 11 is cooled to a temperature (b° C.) lower than a° C. to remove the gas. For example, as indicated by a double-headed arrow B in FIG. 3, the gas is removed at b° C., which is 300° C. to below 700° C.

Next, the melt 11 is heated to a temperature (c° C.) suitable for molding. For example, c=400° C. to below 700° C. Thereafter, an inert gas atmosphere or a reducing gas atmosphere is formed in the container 1, and the melt 11 is discharged from the container 1.

As illustrated in FIG. 2(b), the coil 10B is disposed around the pipe sleeve 5. An electric current is supplied to the coil 10B, and the pipe sleeve 5 is induction-heated. The pipe 4 and the plug 12 in the pipe 4 are heated by radiant heat from the pipe sleeve 5. Note that the plug 12 is a solid glass and does not contain an elemental metal or an alloy, and thus is not induction-heated. The above heating by the radiant heat causes the plug 12 to melt, and the melt 11 is discharged from the container 1.

Note that, the methods illustrated in FIG. 1(a) to FIG. 1(c) and in FIG. 2(a) and FIG. 2(b) as well as the temperature shown in FIG. 3 are examples, and the methods in the step of turning the raw material 6 into the melt 11, in the step of homogenizing the melt 11, and in the step of discharging the melt 11 from the container 1, as well as the temperature in each step are not limited to those described above.

The discharged melt 11 flows into a suitable mold, for example. The melt 11 is then cooled in the mold, forming a glass. A preform glass can be prepared by grinding, polishing, and cleaning the glass. Then, the preform glass can be subjected to press molding or the like, so that an optical member such as a lens can be prepared. Note that, an optical member such as a lens may be directly produced from the glass without preparing the preform glass.

The feature of the present embodiment lies in the removing of the inert gas or the reducing gas by setting a temperature, in the step of removing the gas from the melt 11, lower than that in the step of homogenizing the melt 11, after the raw material 6 is melted in an atmosphere of the inert gas or the reducing gas and the melt 11 is homogenized. Since the step of turning the raw material 6 into the melt 11 and the step of homogenizing the melt 11 are performed in the atmosphere of the inert gas or the reducing gas, the oxidation can be suppressed. Furthermore, the gas is removed at a low temperature, and thus can be removed more reliably. More specifically, a lower temperature is likely to lead to higher gas solubility. On the other hand, a lower temperature leads to lower solubility of the inert gas and the reducing gas in the melt 11. Therefore, in the present embodiment, removing the gas from the melt 11 can be performed more reliably, and foaming in the melt 11 can be suppressed when forming glass. Therefore, inclusion of bubbles in the formed glass can be more reliably suppressed, and the productivity of the glass can be improved.

At least one of the step of turning the raw material 6 into the melt 11 or the step of homogenizing the melt 11 may be performed in an atmosphere of the inert gas atmosphere or the reducing gas. Both of the step of turning the raw material 6 into the melt 11 and the step of homogenizing the melt 11 are preferably performed in an atmosphere of the inert gas or the reducing gas. Thus, the oxidation can be more reliably suppressed.

In the step of removing the gas from the melt 11, it is preferable to reduce the pressure in the container 1 as in the present embodiment. As a result, the removing of the gas can be effectively performed. However, the pressure reduction at the time of removing of the gas is not essential.

In the present embodiment, after the step of removing the gas from the melt 11, the melt 11 is heated, and the melt 11 is discharged from the container 1. As described above, it is preferable that the temperature of the melt 11 in the step of removing the gas from the melt 11 is lower than the temperature of the melt 11 in the step of discharging the melt 11 from the container 1. As a result, the gas can be removed more reliably.

It is preferable that at least one of the step of turning the raw material 6 into the melt 11 or the step of homogenizing the melt 11 is performed in an atmosphere of one of the inert gas and the reducing gas, and the step of discharging the melt 11 from the container 1 is performed in an atmosphere of the other of the inert gas and the reducing gas. Specifically, for example, when the step of homogenizing the melt 11 is performed in the inert gas atmosphere, the step of discharging the melt 11 from the container 1 is preferably performed in the reducing gas atmosphere. Alternatively, for example, when the step of homogenizing the melt 11 is performed in the reducing gas atmosphere, the step of discharging the melt 11 from the container 1 is preferably performed in the inert gas atmosphere. Thus, the reduction of the gas in the melt 11 is facilitated.

The temperature (a° C.) in the step of homogenizing the melt 11 is preferably 600° C. to 1000° C., 700° C. to 1000° C., or 750° C. to 1000° C., and is particularly preferably 800° C. to 950° C. A temperature too low in the step of homogenizing the melt 11 leads to a high viscosity of the melt 11, rendering the homogenization of the melt 11 difficult. Furthermore, the productivity is likely to be compromised. A temperature too high in the step of homogenizing the melt 11 facilitates the deterioration of the container 1. Furthermore, the raw material 6 is likely to volatilize.

The temperature (b° C.) in the step of removing the gas is preferably 300° C. to below 700° C., or 300° C. to below 600° C., and is particularly preferably 300° C. to below 500° C. A temperature too low in the step of removing the gas leads to a high viscosity of the melt 11, which ends up rendering the removing of the gas difficult. Furthermore, devitrification of the melt 11 is likely to occur. A temperature too high in the step of removing the gas renders the removing of the gas insufficient.

The temperature (c° C.) suitable for molding is appropriately adjusted so as to obtain a viscosity suitable for a desired molding means, and is preferably, for example, 400° C. to below 700° C., or 450° C. to 650° C., and is particularly preferably 500° C. to 650° C.

The temperature (b° C.) in the step of removing the gas is preferably lower than the temperature suitable for molding (c° C.). This facilitates sufficient removing of the inert gas or the reducing gas.

The proportion of the materials contained in the raw material 6 of the present embodiment is adjusted to give the resulting glass having the following composition. In the description of the composition of the glass, "%" means "mol %". Note that, for example, the sum of the contents of A, B, and C may be referred to as "content of A+B+C" or "A+B+C".

The glass formed according to the method of the present embodiment contains, in terms of mol %, greater than 0% and 50% or less of Ge, greater than 0% and 50% or less of Ga, 30% to 90% of Te, greater than 0% and 40% or less of Ag+Al+Ti+Cu+In+Sn+Bi+Cr+Zn+Mn, and 0% to 50% of F+Cl+Br+I in the glass composition.

Ge is a component for forming a glass network. Ge is also a metalloid element. The content of Ge is greater than 0% and 50% or less, preferably 2% to 40%, more preferably 4% to 35%, even more preferably 5% to 30%, still even more preferably 7% to 25%, and yet still even more preferably 10% to 20%. When the content of Ge is too small, vitrification becomes difficult. Meanwhile, when the content of Ge is too large, Ge-based crystal tends to precipitate, and raw material costs tend to be high.

Ga is a component for increasing thermal stability (stability of vitrification) of glass. Ga is also a metal element. The content of Ga is greater than 0% and 50% or less, preferably 1% to 45%, more preferably 2% to 40%, even more preferably 4% to 30%, still even more preferably 5% to 25%, and yet still even more preferably 10% to 20%. When the content of Ga is too small, vitrification becomes difficult. Meanwhile, when the content of Ga is too large, Ga-based crystal tends to precipitate, and raw material costs tend to be high.

Te, which is a chalcogen element, is a component essential for forming a glass network. Te is also a metalloid element. The content of Te is 30% to 90%, preferably 40% to 89%, more preferably 50% to 88%, even more preferably 60% to 86%, and still even more preferably 70% to 85%. When the content of Te is too small, vitrification becomes difficult. Meanwhile, when the content of Te is too large, Te-based crystal tends to precipitate.

Ag+Al+Ti+Cu+In+Sn+Bi+Cr+Zn+Mn are metal elements. When a glass contains the above metal elements, the glass can have higher thermal stability. The content of Ag+Al+Ti+Cu+In+Sn+Bi+Cr+Zn+Mn is from 0% to 40%, preferably greater than 0% and 30% or less, more preferably greater than 0% and 20% or less, and even more preferably from 0.1% to 10%. When the content of Ag+Al+Ti+Cu+In+Sn+Bi+Cr+Zn+Mn is too small or too large, vitrification becomes difficult. Note that the individual content of each of Ag, Al, Ti, Cu, In, Sn, Bi, Cr, Zn, and Mn is 0% to 40%, preferably 0% to 30% (with the content of at least one component being greater than 0%), more preferably 0% to 20% (with the content of at least one component being greater than 0%), and even more preferably 0.1% to 10%. Of these, it is preferable to use Ag and/or Sn because Ag and Sn are particularly effective in increasing the thermal stability of glass.

In addition to the above components, the glass formed in the present embodiment may contain, for example, the following components.

F, Cl, Br, and I are also components that increase the thermal stability of glass. The content of F+Cl+Br+I is 0% to 50%, preferably 1% to 40%, more preferably 1% to 30%, even more preferably 1% to 25%, and particularly preferably 1% to 20%. When the content of F+Cl+Br+I is too large, vitrification becomes difficult, and weather resistance tends to be weak. Note that the individual content of each of F, Cl, Br, and I is 0% to 50%, preferably 1% to 40%, more preferably 1% to 30%, even more preferably 1% to 25%, and particularly preferably 1% to 20%. Of these, it is preferable to use I because the element raw material can be used and the effect of increasing glass stability is particularly great.

The inclusion of Si, Sb, and Cs results in an increased thermal stability. Here, Si and Sb are metalloids. Si+Sb+Cs is preferably 0% to 40%, more preferably 0% to 30%, even more preferably 0% to 20%, and still even more preferably 0.1% to 10%. The content of each of the components Si, Sb, and Cs is 0% to 40%, preferably 0% to 30%, more preferably 0% to 20%, and particularly preferably 0.1% to 10%.

S is a component that widens the vitrification range and tends to improve the thermal stability of glass. The content of S is preferably 0% to 30%, more preferably 0% to 20%, even more preferably 0% to 10%, and particularly preferably 0% to 3%. When the content of S is too large, transmissivity of infrared rays having a wavelength of 10 μm or greater tends to be small.

Se and As are components that widen the vitrification range and improve the thermal stability of glass. The individual content of each of Se and As is preferably 0% to 10%, more preferably 0% to 5%, and particularly preferably 0.5% to 5%. However, since these substances are toxic, the glass is preferably substantially free of Se and As from the viewpoint of reducing the effects on the environment and the human body, as described above.

Note that the glass is preferably substantially free of Cd, Tl, and Pb, which are toxic substances. Here, "substantially free" means a content of 0.1% or less.

A proportion of the metal in the raw material 6 is, in terms of vol %, preferably 80% or greater, more preferably 85% or greater, and particularly preferably 90% or greater. With such a configuration, the raw material 6 can be easily melted by induction-heating. As such, the temperature can be increased or decreased more easily and faster than when using radiation heating, and productivity can be increased. An upper limit of the proportion of the metal in the raw material 6 is not limited, but may be, in terms of vol %, for example, 100% or less, 99% or less, and particularly 98% or less.

REFERENCE SIGNS LIST

1 Container
2 Bottom portion
3 Side wall portion
4 Pipe
5 Pipe sleeve
6 Raw material
7 Lid
8 Gas supply pipe
9 Gas discharge pipe
10A Coil
10B Coil
11 Melt
12 Plug

The invention claimed is:

1. A glass production method comprising the steps of:
turning a raw material placed in a container into a melt;
homogenizing the melt; and
removing a gas from the melt,
heating the melt and discharging the melt from the container after the step of removing the gas from the melt, wherein
at least one of the step of turning the raw material into the melt and the step of homogenizing the melt is performed in an atmosphere of an inert gas or a reducing gas,
in the step of removing the gas from the melt, the inert gas or the reducing gas is removed by setting the temperature of the melt to be lower than the temperature in the step of homogenizing the melt,
the at least one of the step of turning the raw material into the melt and the step of homogenizing the melt is performed in an atmosphere of one of the inert gas and the reducing gas,
the step of discharging the melt from the container is performed in an atmosphere of the other of the inert gas and the reducing gas in the container, and
the glass is chalcogenide glass.

2. The glass production method according to claim 1, wherein in the step of removing the gas from the melt, pressure in the container is reduced.

3. The glass production method according to claim 1, wherein both the steps of the turning the raw material into the melt and the homogenizing the melt are performed in the atmosphere of the inert gas or the reducing gas.

* * * * *